US012797769B2

(12) United States Patent
Garcia et al.

(10) Patent No.: US 12,797,769 B2
(45) Date of Patent: Nov. 17, 2026

(54) METHOD FOR TREATING A FLUID COMPRISING SALTS AND SYSTEM FOR IMPLEMENTING THE METHOD

(71) Applicant: HYDROMECANIQUE ET FROTTEMENT, Andrezieux Boutheon (FR)

(72) Inventors: Frédéric Garcia, Saint Laurent d'Agny (FR); Georges Vial, Saint-Just-Saint-Rambert (FR); Marie-Noëlle Desbouche-Janny, La Fouillouse (FR)

(73) Assignee: HYDROMECANIQUE ET FROTTEMENT, Andrezieux Boutheon (FR)

( * ) Notice: Subject to any disclaimer, the term of this patent is extended or adjusted under 35 U.S.C. 154(b) by 243 days.

(21) Appl. No.: 18/567,800

(22) PCT Filed: Jul. 13, 2022

(86) PCT No.: PCT/EP2022/069573
§ 371 (c)(1),
(2) Date: Dec. 7, 2023

(87) PCT Pub. No.: WO2023/285515
PCT Pub. Date: Jan. 19, 2023

(65) Prior Publication Data

US 2024/0278147 A1 Aug. 22, 2024

(30) Foreign Application Priority Data

Jul. 16, 2021 (EP) .................................... 21305998

(51) Int. Cl.
*B01D 1/04* (2006.01)
*B01D 1/00* (2006.01)
(Continued)

(52) U.S. Cl.
CPC .......... *B01D 5/006* (2013.01); *B01D 1/0064* (2013.01); *C02F 1/048* (2013.01); *C02F 2301/063* (2013.01); *C02F 2301/08* (2013.01)

(58) Field of Classification Search
CPC ........ B01D 1/0064; B01D 5/006; C02F 1/048
See application file for complete search history.

(56) References Cited

U.S. PATENT DOCUMENTS 3,891,495 A * 6/1975 Baird ........................ B01J 19/06 159/6.3
4,314,877 A 2/1982 Queiser et al.
(Continued)

FOREIGN PATENT DOCUMENTS

CN 102713481 A 10/2012
DE 102011121650 A1 6/2013
(Continued)

OTHER PUBLICATIONS

International Search Report for PCT/EP2022/069573, mailed Oct. 11, 2022, 7 pages.
(Continued)

*Primary Examiner* — Jonathan Miller
(74) *Attorney, Agent, or Firm* — NIXON & VANDERHYE

(57) ABSTRACT

A process for treating a fluid includes: a step of introducing fluid to treat into a chamber of a dryer, a step of drying the fluid in the chamber including a first phase during which a weight of the chamber reduces and when the weight of the chamber reaches a lower threshold or a rate of variation of the weight of the chamber is less than a first predefined value, the drying step includes a step of complementary filling of the chamber until the weight of the chamber reaches an upper threshold and a second phase during which the weight of the chamber decreases and when the rate of variation of the weight is less than a second predefined
(Continued)

value, the process includes a step of extracting a solid residue in powder form. The invention also concerns an installation for implementing the process.

13 Claims, 5 Drawing Sheets

(51) Int. Cl.
*B01D 5/00* (2006.01)
*C02F 1/04* (2023.01)

(56) References Cited

U.S. PATENT DOCUMENTS

| | | | | |
|---|---|---|---|---|
| 5,011,571 | A * | 4/1991 | Kobayashi | B01D 3/101 203/91 |
| 8,832,962 | B2 * | 9/2014 | Pardo | F26B 23/002 34/304 |
| 9,266,747 | B1 * | 2/2016 | Sparrow | B01D 3/065 |
| 2008/0174033 | A1 | 7/2008 | Duesel et al. | |
| 2010/0089740 | A1 * | 4/2010 | Vuong | C02F 1/048 202/197 |
| 2012/0304488 | A1 * | 12/2012 | Pardo | F26B 25/22 34/514 |
| 2013/0153397 | A1 * | 6/2013 | Carl | B01D 3/42 202/262 |

FOREIGN PATENT DOCUMENTS

| | | | |
|---|---|---|---|
| FR | 2196183 | A1 | 3/1974 |
| JP | 2007303712 | A | 11/2007 |
| WO | 2013116789 | A1 | 8/2013 |

OTHER PUBLICATIONS

Written Opinion of the ISA for PCT/EP2022/069573, mailed Oct. 11, 2022, 7 pages.
Office Action, issued in Chinese Patent Application No. 202280004549.0 dated Sep. 24, 2025.

* cited by examiner

METHOD FOR TREATING A FLUID COMPRISING SALTS AND SYSTEM FOR IMPLEMENTING THE METHOD

CROSS-REFERENCE TO RELATED APPLICATIONS

This application is the US national stage of PCT/EP2022/069573, filed Jul. 13, 2022 and designating the United States, which claims the priority of EP 21305998.3, filed Jul. 16, 2021. The entire contents of each foregoing application are incorporated herein by reference.

BACKGROUND OF THE INVENTION

Field of the Invention

The invention concerns a process for treating fluid, in particular for example a fluid containing salts, referred to as "salt solution", in particular at a low or medium concentration of salts, that is to say having for example a salt content less than 500 g/L, or possibly than 300 g/L.

It is directed in particular to recycling fluid waste, for example such as that generated by a salt bath treatment line.

The invention also concerns an installation enabling such a process to be implemented.

Description of the Related Art

By way of illustration in the field of nitriding, parts, for example of steel, are generally treated in batches of several parts, also referred to as batch processing, on a nitriding line.

For this, the parts to treat are degreased, then rinsed and dried in an oven.

The dry parts are then immersed in a nitriding bath, in a vessel (also called crucible) at high temperature (for example of the order of 500-650° C.). Such a nitriding bath is generally mainly composed of molten nitriding salts.

The nitriding is for example directed to providing the parts with an increased surface hardness and to improving their mechanical properties, for example by diffusion of nitrogen within the steel of steel parts.

After the nitriding, the parts are optionally immersed in an oxidizing bath, in a vessel (also called crucible), for example at approximately 450° C. Such an oxidation bath is generally mainly composed of molten oxidizing salts.

The oxidation is for example directed to improving the corrosion resistance of the parts. It generally gives them a uniform black appearance.

After the nitriding, or the oxidation as the case may be, the parts undergo a quenching step, for example in a water tank at a temperature very much lower than that of the bath, i.e. relatively cool.

However, the various baths become polluted in the course of successive passes through. The water of the rinsing or quenching tanks (this water also being referred to as "eau de claquage") is also enriched in oxidizing and/or nitriding salts, for example nitrates and nitrites.

This quenching water, being dangerous liquid waste, requires to be treated by companies specialized in the treatment of such waste. In general, the treatment consists of an incineration.

Furthermore, it is necessary to store this quenching water before sending it for such treatment.

In parallel, successive batches passing through the nitriding and/or oxidizing baths generate sludge, which also contains nitriding and/or oxidizing salts.

These different forms of waste thus require storage before being sent for treatment.

Operations of storage and treatment generate not only high costs, but also have a harmful environmental impact.

There has thus arisen a certain need to be able to treat this waste, in particular at least to recover therefrom the salts it contains.

The particle size of the recovered salt must not be too fine in order to avoid the problem of powder volatility, nor to coarse (for example greater than 1 cm) since a larger size of particle more easily retains residual water. It can then be dangerous to use such a salt for example for treatment in molten salt baths, since the instantaneous evaporation of the water on melting of the salt can give rise to splatter of the molten salt.

With the object of recovering the salts, drying technologies have been tested, here on the nitriding and/or oxidizing quenching water, at "semi-industrial" scale, in particular an evapo-concentration process, or for example a process of atomization by spraying.

Tests have been carried out with an evapo-concentrator under a vacuum and with a scraper. The process enabled a concentrate to be obtained with approximately 30% moisture content, which is not usable in such a state for application to a nitriding/oxidizing line. An additional drying step is then necessary to obtain a powder with a dryness of at least 95%, and if possible at least 98%. A centrifugation test did not enable the required dryness to be obtained. This approach in two steps has therefore not been chosen.

Atomization consists of drying a solution introduced by a nozzle, by a stream of hot air in an atomization tower; the droplets are instantaneously dried and the powder is collected in a cyclone separator.

Tests with a single effect atomizer produced powders of characteristic is the size comprised between 30 μm and 50 μm, i.e. much too fine for the objectives of use sought. Other tests with a "multi-effect" atomizer have enabled a powder to be obtained with a higher particle size, but which did not however meet the objectives sought: as a matter of fact the target dryness for some salts was not reached and the particle size profile of other salts obtained did not match the required profile.

Furthermore, the equipment that appeared to be required for implementing the aforementioned processes is relatively bulky and sophisticated, requiring ancillary equipment in addition (evapoconcentration and vibrofluidiser), which makes it relatively costly.

A "hybrid" version (flash atomizer) has also been tested on pilot equipment.

Flash atomization is based on the same principle as an atomization tower but is characterized by a toroidal drying visual making it possible to accelerate the drying of particles, with more compact equipment.

Tests carried out were however not conclusive since the powder agglomerates prematurely in the toroidal vessel.

There also exist processes of crystallization with controlled particle size, implemented in a crystallizer, but they have proved difficult to use or insufficiently effective for multi-component solutions or very soluble salts.

The known processes thus produced powders that are too fine, or have too high a degree of humidity, or that are too costly, or are not suitable for treating multi-component salts.

It has thus appeared necessary to develop another treatment process for recovering and recycling residual salts in a salt solution, in particular at least for fluid waste containing nitriding and/or oxidizing salts.

SUMMARY OF THE INVENTION

The present invention is thus directed to overcoming, at least in part, the aforementioned drawbacks, leading furthermore to other advantages.

To that end, according to a first aspect of the invention, there is provided a process for treating a fluid comprising salts, for example in particular nitriding and/or oxidizing salts, the process comprising:

- A step of introducing fluid to treat into a chamber of a dryer;
- A step of drying the fluid in the chamber by putting at a temperature comprised between 30° C. and 90° C. and at a pressure comprised between 10 mbars and 900 mbars, the drying step comprising a sub-step of evaporating at least some of the fluid, producing at least water vapor, and a sub-step of increasing salt concentration of the fluid contained in the chamber, the drying step comprising:
  - a first phase during which a weight of the chamber reduces and when the weight of the chamber reaches a lower threshold or a rate of variation of the weight of the chamber is less than a first predefined value, the drying step comprises a step of complementary filling of the chamber until the weight of the chamber reaches an upper threshold; and
  - a second phase during which the weight of the chamber decreases and when the rate of variation of the weight is less than a second predefined value, the process comprises
- A step of extracting a solid residue in powder form.

Such a process thus makes it possible to recover nitriding salts, and/or oxidizing salts, but also salts arising from heat treatment, or for instance salt water desalination.

The fluid to dry may for example come from an aqueous salt solution coming from a tank of a nitriding production line, for example a quenching tank.

Furthermore, the fluid to treat, the salt solution, may have multiple component and include very soluble salts.

For example, the fluid to dry initially has a salt concentration less than 500 g/L, for example comprised between 50 g/L and 500 g/L, or even for example between 300 g/L and 400 g/L.

Such a process thus makes it possible to recover the salts contained in fluids from a nitriding line, for example in quenching water and/or sludge, and thereby reduce the waste; incidentally certain processing costs are thus brought under control.

Such a process makes it possible to eliminate amounts of fluid waste since they are recycled, at least in part, or even completely to the extent possible, to extract the salts contained in that fluids those fluids further to the successive passages of parts through at least one tank from it comes.

It furthermore makes it possible to limit wasting of non-renewable resources and to recover raw materials.

For example, on oxidizing and/or nitriding quenching water, such a process in particular makes it possible to obtain a desired particle size, composition and dryness of the recovered salts, in a drying time that is possibly relatively short, and in a single drying step.

The chamber of the dryer is for example kept under a vacuum.

Here, the vacuum for example designates a pressure comprised between approximately 10 mbars and 900 mbars (millibars), for example between 20 mbars and 500 mbars, or even between 20 mbars and 100 mbars.

Such a vacuum makes it possible to evaporate the salt solution at relatively low temperatures, for example between 35° C. and 90° C. It may also be used to transfer the fluid to treat by suction.

The complementary filling during the drying step thus enables semi-continuous filling of the chamber, that is to say filling such that the fluid to treat is added to the chamber of the dryer while the chamber empties on account of the treatment.

Thus, the first phase of the drying step comprises at least one cycle in which the fluid is concentrated while vapors are evaporated, until the weight of the chamber reaches a lower threshold or its variation rate is less than a first predefined value, then complementary filling is carried out.

As a matter of fact, during the processing, i.e. during is drying step and in particular during the concentration phase, some of the fluid, in particular the water of the fluid, evaporates, and therefore the weight of the content of the chamber decreases.

In parallel, the concentration of salts in the fluid contained in the chamber increases.

For example, the dryer comprises a load cell system configured to check a weight of fluid contained in the chamber.

During the first phase of the drying step, when the weight of the chamber for example attains a certain threshold, referred to as lower threshold, or when a rate of variation of the chamber weight is less than a first predefined value (i.e. the variation of weight diminishes over a given period), a valve is then opened to introduce fluid to treat. So long as the weight is greater than that threshold, or varies more than the first predefined value, the chamber is considered to be sufficiently filled, and the evaporation carries on.

The lower threshold is chosen such that the addition of fluid has a small incidence on the temperature of the content of the chamber (for example the temperature varies less than 20%, or possibly than 15% or less than even 10% or even than 5%, or for instance less even than 3% relative to the average temperature of the content of the chamber before addition); for example the lower threshold is chosen to represent approximately 85% of the maximum volume of the chamber.

The thresholds are for example determined for each complementary filling so as to represent a substantially constant filling volume. As a matter of fact, as the drying step progresses, the fluid in the chamber becomes more concentrated in salt. A same volume thus weighs increasingly heavy. Due to this, the threshold value may vary from one complementary filling operation to another.

Thus, for example, the process comprises a step of checking a weight of the chamber, and when the weight reaches the lower threshold or when the rate of variation of the weight of the chamber is less than the first predefined value, the process comprises a step of opening a filling valve and the step of complementary filling with fluid to treat in the chamber is implemented.

Moreover, for example, when the weight of the chamber reaches an upper threshold, the process comprises a step of closing the filling valve.

For example, the load cell system is also configured to detect the end of the drying, at the end of the second phase. For example, when the weight of the chamber remains relatively constant over time (that is to say that the variation in weight of the chamber over time becomes less than a second predefined value), it is then considered that all the water has been evaporated and the product is "dry" (has reached the degree of dryness aimed at).

The first predefined value and the second predefined value may be equal or different, for example the second predefined value may be less than the first predefined value; for example the second predefined value may be close to zero.

For example, after a predefined number of complementary filling operations, or when the chamber has attained a certain weight, the second phase is implemented.

For example, the complementary filling operations of the first phase are reiterated until a concentration of salt in the fluid contained in the chamber reaches a target value; for example at least 400 g/L, preferably at least 500 g/L for oxidizing and/or nitriding salts, but the target value of course depends on the nature of the salts and/or on the applications considered.

In an example of implementation, the drying step is configured to produced the solid residue with a moisture content comprised between 0.5% and 5%, by weight, or even between 0.5% and 3%, or even between 1% and 2%.

The moisture content is for example monitored by a thermal balance, for example on a sample taken of solid residue.

In an example of implementation, the drying step is configured to produce the solid residue having a specific particle size.

For example, the solid residue takes the form of a powder of particle size comprised between 100 μm and 1000 μm, for example between 200 μm and 500 μm, on average. The particle size must not be too fine in order to avoid the problem of powder volatility, nor to coarse (for example greater than 1 cm) since a larger size of particle more easily retains residual water.

By virtue of such a drying process, using a dryer as described below in the context of the present invention, it is possible to obtain the desired particle size.

In an example of implementation, the drying step comprises a lump-breaking step.

Such a step is directed to limiting, or even preventing, formation of lumps in the chamber.

In an example of implementation, the process comprises a step of condensing vapor coming from the dryer, producing a condensate.

The process then furthermore enables a reduction in the consumption of water by the re-use of the condensate.

For example, the process then comprises a step of introducing the condensate into a tank, for example a tank of rinsing water.

For example, the condensate obtained may then be used as rinsing water.

The step of condensing water is for example implemented in a condenser.

According to an implementation option, the process comprises a step of absorbing-neutralizing gas generated at the step of condensing vapor by an absorber-neutralizer, also called a scrubber.

In an advantageous embodiment, the process comprises a step of extracting fluid to treat from a tank of a nitriding line, or even for example from a storage tank.

For example, the process comprises a step for filtering the fluid to treat before the step of introducing into the chamber of the dryer.

The filtering step for example comprises a step of passing the fluid through a screen of mesh size less than or equal to 50 μm, for example comprised between 2 μm and 50 μm. The filtering step comprises for example a step of eliminating particles by a magnetic bar.

For example, such a magnetic bar captures magnetic particles, in particular for example iron oxides.

The invention also concerns an installation configured to implement a process comprising at least some of the steps described above.

For this, the installation comprises at least one dryer, which is configured to implement at least the drying step.

The dryer principally comprises a chamber.

The chamber is for example of generally cylindrical shape.

The chamber is for example a non-rotary chamber.

For example, the chamber comprises at least one inlet for fluid to dry, configured to introduce the fluid to dry into the chamber.

For example, the chamber comprises at least one outlet for discharging solid residue.

For example, the chamber comprises at least one vapor outlet.

In an advantageous example embodiment, the dryer comprises a mixer, in particular a heated helical mixer, heated for example by circulation of a heat-conveying fluid.

For example, the mixer is configured to turn within the chamber, for example at a moderate speed, for example up to 100 rpm, for example between 1 rpm and 100 rpm (revolutions per minute), for example between 1 rpm and 25 rpm, which makes it possible to mix, sufficiently evenly here, the fluid to dry and to improve its contact with a wall of the chamber.

The mixer passes for example at a distance from the wall of the chamber in order to avoid scraping the wall and thus limiting wear of the mixer.

In other words, the helical stirrer is heated and extends in the vicinity of the wall of the chamber in order to ensure homogeneity of the mixture and uniformity of the temperature in the chamber.

In an advantageous example embodiment, the chamber comprises a conical bottom.

Such a conical bottom facilitates discharging the solid residue obtained.

For example, the solid residue (for example in powder form) is discharged from the chamber of the dryer by gravity.

For example, the conical bottom comprises the discharge outlet for solid residue.

Moreover, a conventional dryer is usually provided for batch operation, for drying pasty products when dry, with a filling ratio of 60% to 100% of a volume of the chamber.

Here, taking into account the fluid to treat, such operation in batch mode would greatly limit productivity and yield of the process. For example, the dry residue obtained after drying 2000 L of fluid would occupy only approximately 20% of the volume of the chamber of the dryer considered here.

The dryer considered here thus makes it possible to work in "semi-continues" mode.

For this, it for example comprises a load cell system.

Such a load cell system is configured to weigh the chamber, possibly continuously, and incidentally to weigh a content of the chamber.

For example, the load cell system comprises at least one weighing sensor.

In order to properly measure the weight of the chamber, the chamber is preferably mechanically decoupled from the rest of the installation, for example using flexible pipes on the inlets and outlets.

A weight loss of the content of the chamber, for example in particular due to evaporation of water from the treated fluid, can then be compensated for by addition of fluid to treat. This furthermore makes it possible to increase a salt concentration of the fluid contained in the chamber progressively with the drying operation.

The volume of the dry residue thus ultimately obtained is of the order of 50% to 75% of the volume of the chamber, or possibly greater than 80% and ideally greater than 90%.

This "semi-continuous" filling operation may be fully automatized: the number of additions and the amount of fluid per addition may for example be configurable. The additions of fluid are made during drying: the fluid is "sucked", for example by pressure difference from a tank, for example a storage tank or buffer tank, connected to the dryer, without releasing the vacuum of the chamber.

For this, for example, the dryer comprises at least one filling valve.

For example, the filling valve is configured to be open when a weight of the chamber reaches a lower threshold or when a rate of variation of the weight of the chamber is less than a first predefined value, and to be closed when the weight of the chamber reaches an upper threshold or when the filling of the chamber reaches its maximum level.

The weight, measured by the load cell system, is for example correlated to the filling ratio of the chamber.

For example, the installation comprises a control system configured to control an opening or a closing of the at least one filling valve according to a weight of the chamber measured by the load cell system.

In an advantageous example embodiment, the chamber comprises a wall formed by a double jacket.

The double jacket is for example configured of cause a heat-conveying fluid to circulate therein.

The heat-conveying fluid is for example configured to maintain a temperature between 30° C. and 90° C. in the chamber where the fluid is treated.

For example, a same heat-conveying fluid circulates in the wall of the chamber and in the helical mixer.

For example, the dryer is a vertical dryer-mixer stirred in a vacuum.

In an example embodiment, the dryer chamber comprises a lump-breaker configured to limit lump formation in the fluid treated in the chamber.

This lump-breaker is for example a bladed lump-breaker, placed in the bottom of the chamber.

Such a lump-breaker is for example configured to turn up to a speed of 1500 rpm.

In an example embodiment, the installation comprises an extraction system configured to convey the fluid to treat from a reservoir, for example from a tank of a nitriding line, to the dryer.

For example, the extraction system comprises a filtration system.

The filtration system comprises for example a screen of mesh size less than or equal to 50 μm, for example comprised between 2 μm and 50 μm, or possibly for example between 5 μm and 10 μm.

For example, the filtration system further comprises a magnetic bar, which is for example configured to eliminate magnetic particles that may be contained in the fluid to treat.

For example, the vapor outlet of the dryer is provided with a filter.

The filter is for example configured to filter vapors. For this, the filter for example comprises a filtering cartridge, for example having unclogging by compressed air.

The filter for example retains ultrafine powder. The unclogging makes this powder fall and restores the effectiveness of the filter.

According to an example embodiment, the unclogged powder falls by gravity into the dryer chamber.

According to an example of implementation, the installation comprises a boiler configured to keep the chamber of the dryer at the desired temperature.

The boiler is for example configured to heat the heat-conveying fluid circulating in the double jacket of the chamber up to 130° C. approximately, as well as in the helical mixer. The boiler is configured to have a heating mode and a cooling mode to reduce the temperature of the solid residue produced.

In an example embodiment, the installation comprises a vacuum module.

For example, the vacuum module is configured to produce a moderate vacuum in the chamber of the dryer, that is to say a pressure comprised between 10 mbars and 900 mbars, for example between 20 mbars and 500 mbars, or even between 20 mbars and 100 mbars.

For example, the vacuum module is configured to produce a pressure of approximately 10 mbar in a drying configuration.

For example, the vacuum module is configured to produce a pressure of approximately 50 mbar in an evaporating configuration.

Such a pressure, likened to a vacuum, thus makes it possible to evaporate water from the fluid at low temperature, that is to say at a temperature comprised between 30° C. and 90° C.

The vacuum module is for example connected to the vapor outlet from the dryer.

For example, the vacuum module comprises at least one vacuum pump.

In an example embodiment, the installation further comprises a condenser.

The condenser is for example configured to condense the vapors coming from the dryer by the vapor outlet and produce a condensate.

The condenser is for example connected to a vapor outlet of the dryer.

The condenser is for example a tubular condenser.

The installation thus makes it possible to recover water, which may be reused.

In an example embodiment, the installation further comprises a cooler.

For example, a tubular heat exchanger is connected to the cooler.

For example, the installation comprises a condensate reservoir configured to collect the condensed vapors.

In an example embodiment, the installation comprises condensate supply piping configured to extract the condensate from the condenser and possibly introduce it back into a tank, for example a rinsing water tank.

According to an advantageous option, the condensate supply piping comprises a filter.

According to an advantageous option, the installation also here comprises an absorber-neutralizer, commonly called a scrubber.

For example, the scrubber is connected to the condenser and makes it possible to reduce or even eliminate a possible presence of toxic or corrosive gases, possibly contained in the condensate (for example ammonia in the case of nitriding).

BRIEF DESCRIPTION OF THE DRAWINGS

The invention, according to an example embodiment, will be properly understood and its advantages will be clearer on reading the following detailed description, given by way of illustrative example that is in no way limiting, with reference to the accompanying drawings in which.

DETAILED DESCRIPTION

Figure 1:
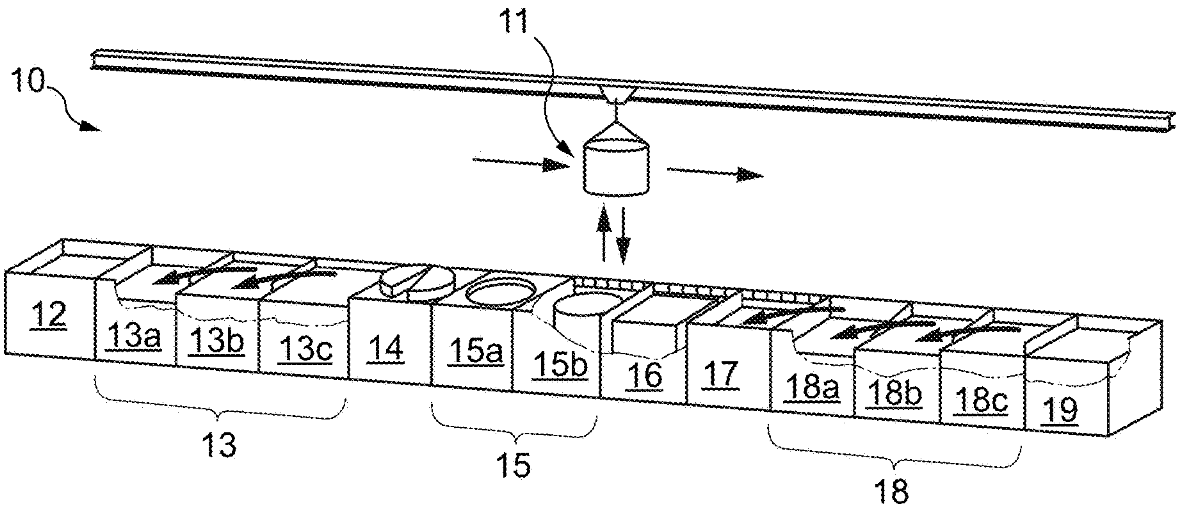
FIG. 1 is a diagrammatic representation of a conventional nitriding line.

FIG. 1 shows an example of a nitriding line 10.

Parts, for example of steel, are arranged in a cage 11 in order to be treated in batches of several parts, also called batch processing.

For this, the cage 11 is for example immersed in a first tank 12 containing a degreasing bath.

They are next rinsed, for example by immersing the cage 11 successively in a rising water bath 13, or even several rinsing water baths in a series 13*a*, 13*b*, 13*c*.

They are next dried in an oven 14.

The cage 11 is next immersed in at least one nitriding bath 15, or even two successive baths 15*a*, 15*b* as shown diagrammatically here. Such a nitriding bath 15 is generally mainly composed of molten nitriding salts, at a temperature of approximately 500-650° C. After nitriding, the parts are optionally immersed in an oxidizing bath 16. Such an oxidizing bath 16 is generally mainly composed of molten oxidizing salts, at a temperature of approximately 450° C.

After the nitriding, or the oxidation as the case may be, the parts undergo a quenching step, for example in a quenching water tank 17, at a temperature very much lower than that of the bath, i.e. relatively cool.

Next, the parts are rinsed in a post-treatment rinsing tank 18, or several tanks 18*a*, 18*b*, 18*c* in series.

Possibly, other treatment operations may be applied, for example such as impregnation. The cage may then be immersed in an impregnation bath 19 for example.

However, the various baths become polluted in the course of successive passes through. For example, sludge gets secreted into the nitriding and/or oxidizing baths 15, 16, which contain nitriding and/or oxidizing salts.

The water of the post-treatment rinsing or quenching tanks 18, 17 (also referred to as “expend water”) is also enriched in oxidizing and/or nitriding salts, for example nitrates and nitrites.

This quenching water 17, being dangerous liquid waste, requires to be treated by companies specialized in the treatment of such waste.

These different forms of waste thus require storage before being sent for treatment.

Figure 2:
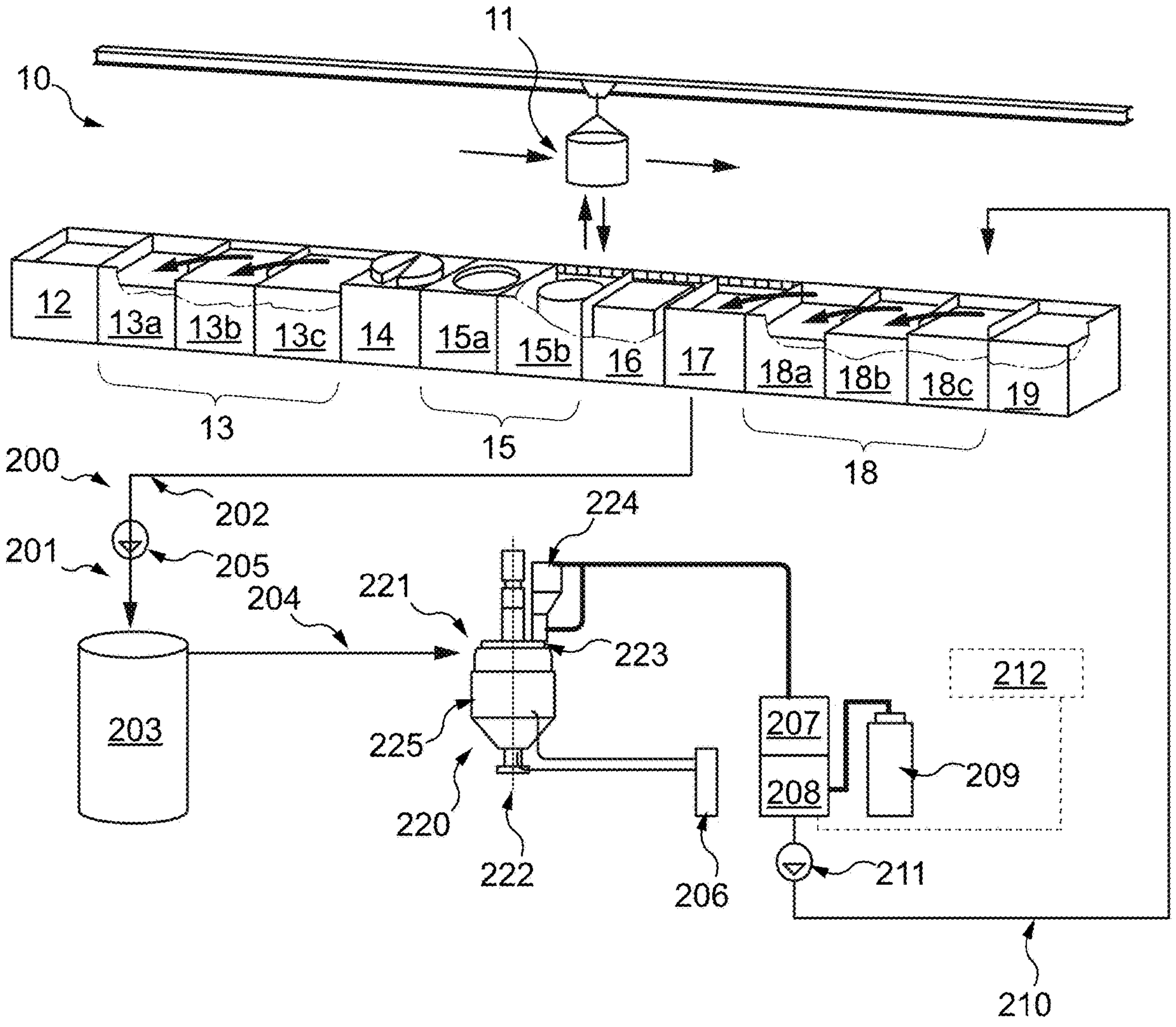
FIG. 2 illustrates a treatment installation according to an example embodiment of the invention, set up in parallel with a nitriding line such as shown in FIG. 1.

FIG. 2 shows an example of an installation 200 making it possible to treat at least part of this waste by recycling the salts it contains.

In this example, a fluid containing salts is extracted from the quenching tank 17, but it could of course be any other tank containing a fluid constituting a salt solution.

Figure 3:
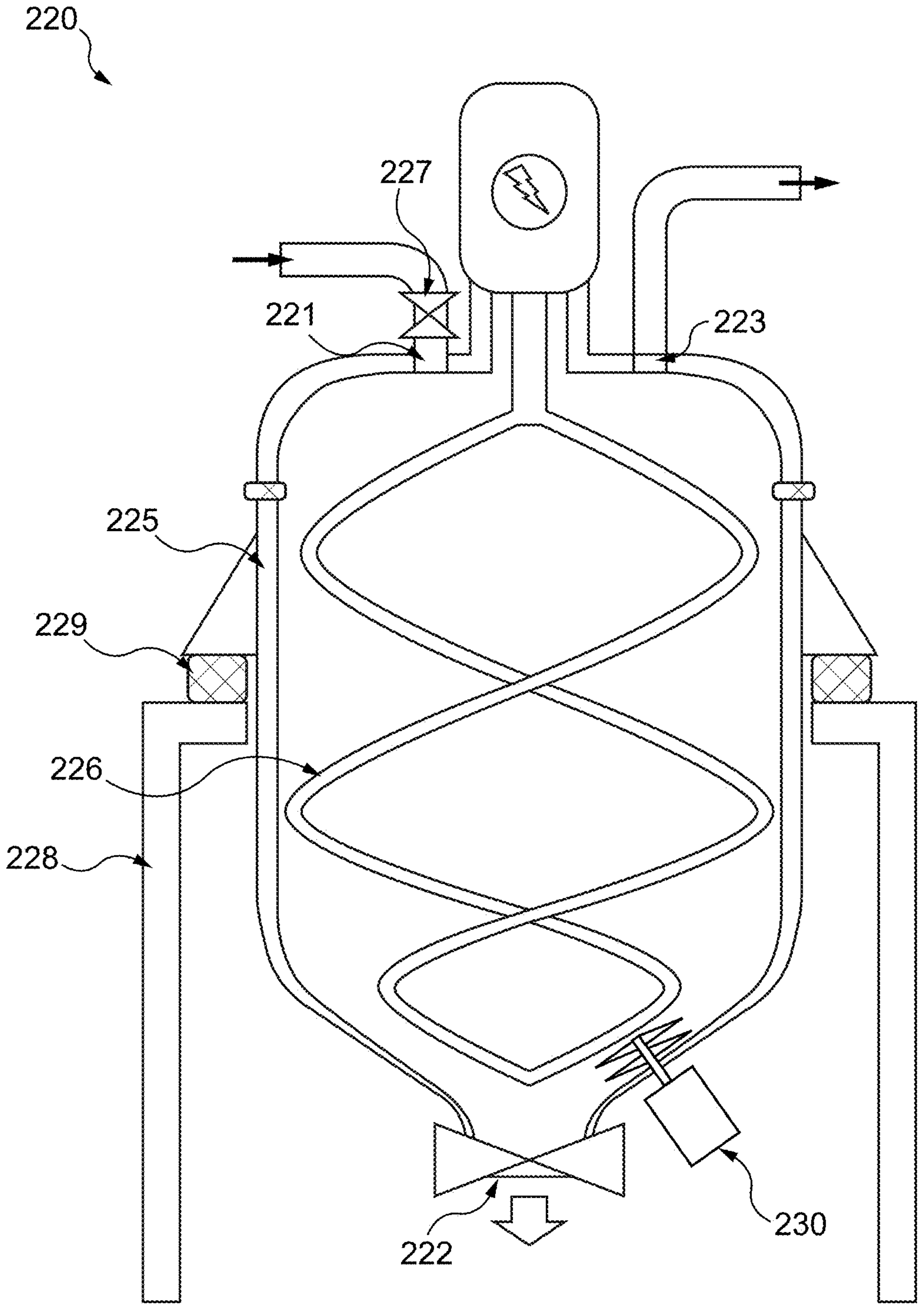
FIG. 3 is a diagram of a dryer according to an example embodiment.

For this, the installation 200 mainly comprises a dryer 220, shown in more detail diagrammatically in FIG. 3.

To convey the fluid to treat from a tank (here the quenching tank 17)) to the dryer 220, the installation here first of all comprises an extraction system 201.

Here the extraction system 201 comprises for example a buffer tank 203, and at least one upstream pipe 202, leading from the tank from where the fluid to treat is extracted to the buffer tank 203.

The upstream pipe 202 here for example comprises a filtration system 205.

The filtration system 205 comprises for example a screen of mesh size less than or equal to 50 μm, for example comprised between 2 μm and 50 μm, or possibly for example between 5 μm and 10 μm.

Here, the filtration system 205 further comprises a magnetic bar, which is for example configured to eliminate magnetic particles that may be contained in the particles to treat. Downstream of the buffer tank 203, the extraction system 201 comprises for example at least one downstream pipe 204, leading from the buffer tank 203 to the dryer 220, in particular to an inlet 221 of the dryer 220 for fluid to dry.

The dryer 220 here comprises at least two outlets 222, 223: an outlet for discharge of solid residue 222 and a vapor outlet 223.

The vapor outlet 223 is provided with two parallel paths which are connected to a vacuum module 207.

A first of the two paths coming from the vapor outlet 223 is for example provided with a filter 224.

The filter 224 is for example configured to filter vapors. For this, the filter 224 for example comprises a filtering cartridge, for example having unclogging by compressed air.

For example, so long as the content of the dryer is sufficiently liquid, the vapors are condensed directly without passing by the filter 224, that is to say by passing via a second of the two paths coming from the vapor outlet 223 and leading to the vacuum module 207.

However, when the content is relatively dry, for example during a phase C of the process as described below, there may then be dust entrained by the vapor and it is then preferable to pass via the filter 224, that is to say via the first of the two paths coming from the vapor outlet 223.

The filter 224 is thus for example activated during phase C of the process.

The installation for example also comprises a boiler 206 configured to keep a chamber of the dryer at a desired temperature.

The boiler 206 is for example configured to heat, to approximately 130° C., a heat-conveying fluid configured to keep an interior of the chamber at a desired temperature.

The heater 206 may be switched to heating or cooling mode to reduce the temperature of the solid residue produced in the chamber during a discharging phase, via the outlet 222 for discharging solid residue.

Downstream of the dryer, the installation next comprises the vacuum module 207 to which is connected the vapor outlet 223.

The vacuum module comprises for example at least one vacuum pump configured to produce a moderate vacuum in a chamber of the dryer 220, that is to say a pressure comprised between 10 mbars and 900 mbars.

The vacuum module for example comprises two pumps which may be used in series or individually (according to the application and effectiveness required), for example a Roots pump, and a liquid ring pump.

The installation may further comprise a condenser 208 configured to condense the vapor coming from the dryer 220 by the vapor outlet 223. The condenser is for example a tubular condenser. The condenser 208 for example comprises a tubular heat exchanger. For this, the installation may further comprise a cooler 209.

For example, the tubular heat exchanger 208 is connected to the cooler 209.

The condensed vapors may be collected in a condensate reservoir.

Here, downstream of the condenser 208, the installation comprises a condensate supply pipe 210 configured to extract the condensate from the condenser and possibly introduce it back into a rinsing water tank, for example here the rinsing tank 18*c*.

It is to be noted that here, the condensate for example comprises liquid water, produced by the condensation of the water vapor coming from the dryer.

In the present example embodiment, the condensate supply pipe 210 optionally comprises a filter 211.

According to an advantageous option, the installation also here comprises an absorber-neutralizer 212, commonly called a scrubber 212. Here, the scrubber 212 is connected to the condenser 208 and makes it possible to reduce or even eliminate a possible presence of toxic or corrosive gases.

Such gases, for example ammonia, may possibly be contained in the condensate.

The dryer 220 is illustrated in more detail in FIG. 3.

The dryer 220 is configured to dry fluids containing salts, whether they be liquids or sludges, in a vacuum. These fluids are also designated salt solutions.

The dryer 220 is a vacuum dryer, in particular a heated vertical mixer, turning at a moderate speed to obtain a rising perimeter flow of product and renewal of the product in contact with the heated walls of the chamber.

For this, the dryer mainly comprises a chamber 225, which is provided with the inlet 221 for fluid to dry, the outlet 222 for discharging solid residue and the vapor outlet 223.

The chamber 225 is fixed here, in that it is not rotary, and is held by a mounting 228.

The chamber 225 here comprises a conical bottom which facilitates discharging of the solid residue obtained.

The outlet 222 for discharging solid residue is thus preferably formed at an end of the conical bottom, at the bottom of the chamber.

The outlet 222 for discharging solid residue comprises for example a spherical valve with metal-to-metal contact.

According to a favored feature, the chamber 225 comprises a double jacket, that is to say an outside wall and an inside wall delimiting between them a space enabling circulation of a heat-conveying fluid.

The heat-conveying fluid is for example heated by electric heating such as the boiler 206 to heat it to 130° C. for example.

For example, the heat-conveying liquid comprises an oil.

In the present example embodiment, the inside wall thus forms an internal tank, which is for example of Hastelloy C22, or any equivalent material.

In the chamber 225, the dryer here comprises a mixer 226 configured to mix and dry the content of the chamber, i.e. the fluid to treat.

The mixer for example comprises a helical blade heated by the circulation of a heat-conveying fluid.

The mixer 226 is for example configured to turn at a variable speed according to need, for example up to 100 rpm.

The mixer 226 here passes at a distance from the inside wall of the chamber 225 in order to avoid scraping the wall and thus limiting wear of the mixer.

According to an advantageous option present here, the dryer comprises a lump-breaker (chopper) 230 in the chamber 225, such a lump-breaker 230 is for example configured to turn at a speed up to 1500 rpm to break possible lumps.

To perform semi-continuous filling, the dryer comprises a filling valve 227.

In the present example embodiment, the filling valve 227 is connected to the dryer inlet 221 for fluid to dry.

For example, the filling valve 227 is placed between the reservoir for fluid to treat and the dryer.

The filling valve 227 is open or closed according to a weight of the chamber.

When it is open, it enables introduction of fluid to treat into the chamber, via the inlet 221 for fluid to dry, through suction of fluid by virtue of the vacuum module 207.

To know the weight of the chamber, the dryer comprises a load cell system 229.

This makes it possible to know the state of filling of the chamber, and, accordingly, to introduce fluid to treat.

In the present example embodiment, the load cell system 229 comprises at least two, preferably three, weighing sensors regularly spaced around the chamber. Their measurement values are then for example averaged (or added together) to determine a weight of the chamber, and thus to know its filling state.

A weighing sensor is diagrammatically disposed here between a shoulder of the chamber and a mounting part 228.

Figure 4:
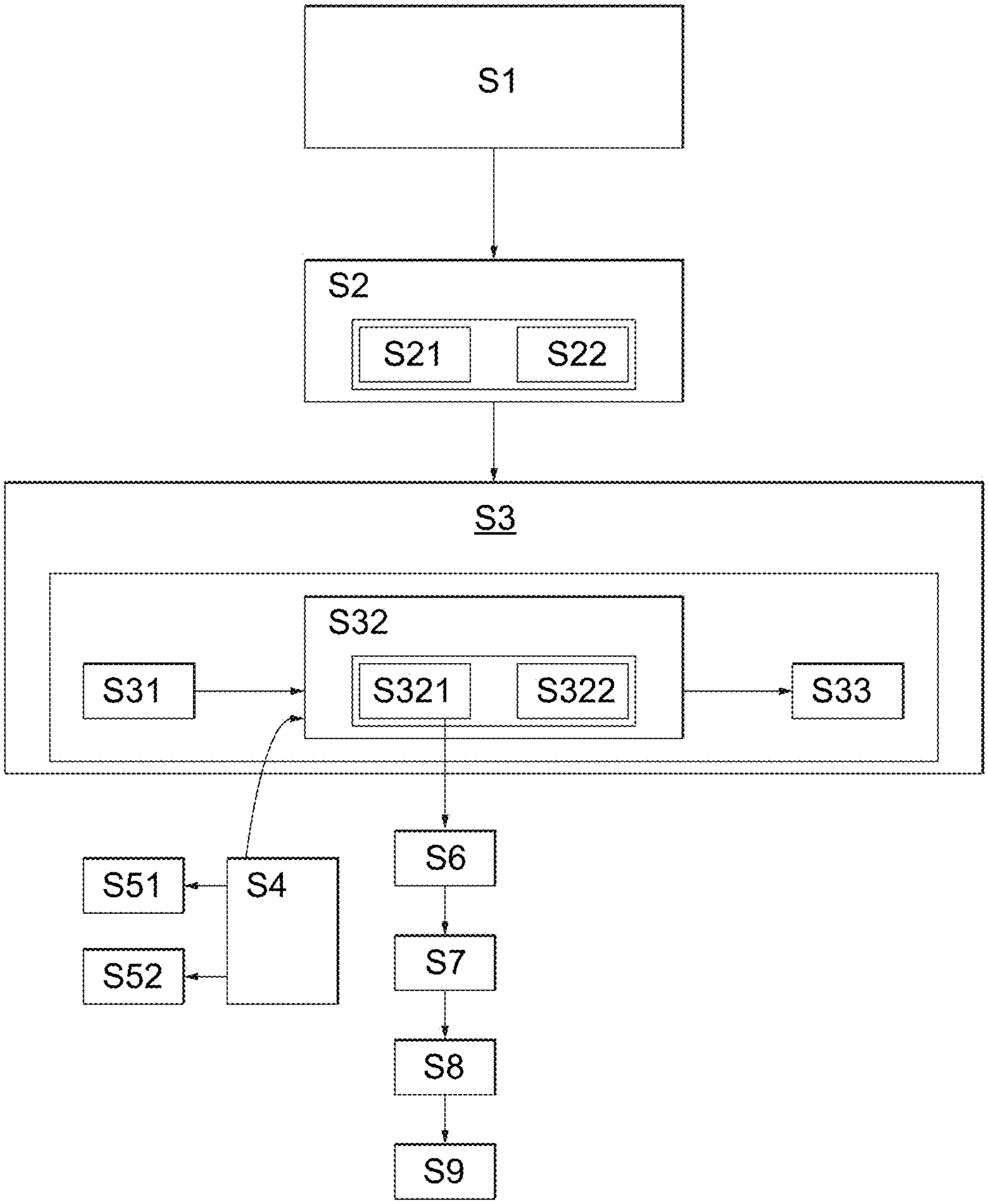
FIG. 4 shows a diagram illustrating a treatment process according to an embodiment of the invention.

FIG. 4 illustrates the main steps of a process for treating a fluid comprising salts according to an example of implementation of the invention, for example in the context of an installation as illustrated in FIG. 2.

The process for example comprises a sequence of steps as follows.

The process first of all comprises a step S1 of extracting fluid to treat from a tank, here a quenching tank 17 of a nitriding line.

The fluid to treat, which is then quenching water containing salts coming from earlier baths for nitriding and oxidizing, is conveyed by the extraction system 201.

The process for example comprises a step S2 for filtering the fluid to treat, for example by the filtering system 205. The filtering step S2 here comprises at the same time a step S21 for passing the fluid through the screen of the filtering system 205 and a step S22 of eliminating magnetic particles, such as iron oxides, by the magnetic bar.

The process next comprises a step S3 of treating the fluid, i.e.:

- A step S31 of introducing fluid to treat into the chamber 225 of the dryer 220, via the inlet 221 for fluid to dry;
- A step S32 of drying the fluid in the chamber 225 by placing at a temperature comprised between 30° C. and 90° C. and at a pressure comprised between 10 mbars and 900 mbars; and
- A step S33 of extracting a solid residue in powder form, which is for example recovered via the outlet 222 for discharging solid residue.

The drying step S32 comprises two steps, which take place concomitantly:

- A sub-step S321 of evaporating at least some of the fluid, producing at least water vapor which is extracted from the chamber 225 by the vapor outlet 223, and
- a sub-step S322 of increasing salt concentration of the fluid contained in the chamber 225

As described in more detail in connection with FIG. 5, the drying step here comprises two phases:

- a first phase (indicated as "B" in FIG. 5) during which a weight of the chamber reduces and when the weight of the chamber reaches a lower threshold or a rate of variation of the weight of the chamber is less than a first predefined value, the drying step comprises a step of complementary filling of the chamber until the weight of the chamber reaches an upper threshold; and a second phase (indicated as "C" in FIG. 5) during which the weight of the chamber reduces and when the rate of variation of the weight is less than a second predefined value, the step S33 of extracting the solid residue is implemented.

To perform the filling semi-continuously, the process here comprises a step S4 of checking a weight of the chamber 225, for example by the load cell system 229, and when the weight reaches a lower threshold (corresponding to a lower filling threshold) or when a rate of variation of the weight of the chamber is less than a second predefined value, the process comprises a step S51 of opening the filling valve 227 and the step of complementary filling of fluid to treat in the chamber 225 is implemented. When the weight of the chamber reaches an upper threshold (corresponding to an upper filling threshold), the process comprises a step S52 of closing the filling valve 227.

In parallel, the interior of the chamber is kept under a vacuum, which enables fluid to treat to be sucked into the chamber when the filling valve 227 is open.

The process here also comprises a step S6 of condensing vapor coming from the dryer 220 by the vapor outlet 223 by means of the condenser 208, thereby producing a condensate.

According to an option represented here, the process comprises a step S7 of vapor scrubbing, by the scrubber 212.

The condensate is for example next conveyed by the condensate supply pipe 210.

According to another option shown here, the process comprises a step S8 of filtering the condensate by the filter 211 of the condensate supply pipe 210.

Next the process comprises a step S9 of injecting the condensate into the rinsing tank 18*c*.

Figure 5:
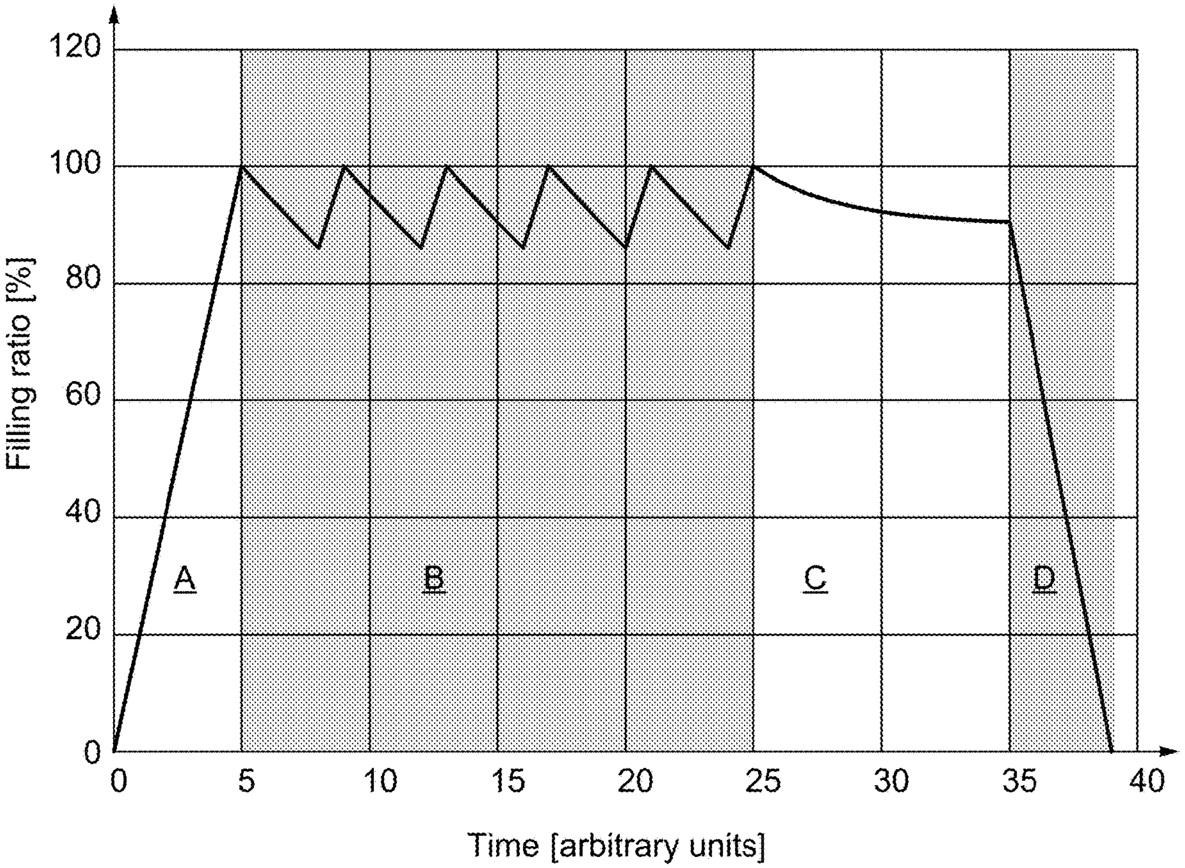
FIG. 5 presents a graph illustrating the fluid treatment in the chamber 225 of the dryer 220 by semi-continuous filling.

FIG. 5 presents a graph illustrating the fluid treatment in the chamber 225 of the dryer 220 by semi-continuous filling.

This graph shows more specifically a change in the filling ratio of the chamber (in %), along the y-axis, according to time that has an arbitrary unit here, along the x-axis.

This graph here shows four phases over time: a phase "A" corresponding to step S31 of introducing fluid to treat into the chamber 225 of the dryer 220 which is initially empty, a phase "B" corresponding to the first phase of drying step S32, during which the content of the chamber is mainly concentrated in salts, a phase "C" corresponding to the second phase of drying step S32, and lastly a phase "D" which corresponds to the step S33 of extracting solid residue, for example by the outlet for discharging solid residue 222.

Filling is usually made with a lift pump (not shown). The end of filling may be detected by weighing or volume measurement.

The chamber is placed under a vacuum after the filling of step S31 of introducing fluid to treat, for example by the vacuum module 207.

During the first phase "B", the weight of the chamber is monitored, for example continuously; reaching a lower threshold, or a slowing until the first predefined value is reached, triggers the opening of the filling valve 227, the fluid is then sucked by the vacuum; reaching the upper threshold triggers the closing of the filling valve 227 again. With the additions of fluid, the salt content in the chamber increases progressively. The upper and lower thresholds may change in the course of the filling operations, in particular to maintain a constant filling ratio in terms of volume. As a matter of fact, the density of the salt may differ from the density of water and the weight depends on the salt content.

The number of filling operations and the variation of the thresholds may be programmed in advance or be entirely governed by the measurements of weight, flow rates or salt content.

When the desired content is reached, the first phase "B" is terminated. The second phase "C" then begins, during which there is no further addition of fluid.

In this step, pumping may be strengthened, for example using a rotary compressor (Roots pump) upstream of the vacuum pump of the vacuum module, which makes it possible to attain higher degrees of dryness. In this step, the weight is also monitored constantly. The weight loss per unit time (equivalent to an evaporation rate) then makes it possible to estimate the remaining moisture content and to determine the end of drying. It is preferably during the second phase "C" that the lump-breaker is set to work, either right from the start, or when a certain moisture content has been reached.

Lastly, the dryer is emptied.

By way of example, a drying operation was carried out on oxidation quenching water coming from a nitriding production line. The solution to treat had an average concentration of 255 g/L. An initial weight of 2324 kg (for a volume of 1857 L) was introduced into the dryer chamber. The chamber was placed under a vacuum (i.e. under approximately 50 mbars) by means of a liquid ring pump. The solution was brought to a temperature of 38° C.

Next the evaporation/concentration cycles were commenced. In total, 3397 kg of quenching water were added in ten steps (i.e. on average 377 kg per addition) for 2421 minutes (constituting the duration of phase B), until a concentration by mass of 52% was attained.

The final drying phase (phase C) was then triggered until the liquid-solid phase transition was observed after 21 hours of drying for a dry residue analyzed at 91.67% (degree of dryness). Switching to vapor filtering mode was carried out, the lump-breaker was triggered and a vacuum of 10 mbars was attained after triggering the Roots pump.

After 6 hours of drying at 85° C., 1217 kg of a powder were extracted from the dryer, having a 99.09% dry extract, then re-used on the nitriding production line without impacting quality. The operation of drying generated in parallel 4335 kg of condensates which were reused in the rinsing operations of the nitriding production line.

The invention claimed is:

1. A process for treating a fluid, comprising:

a step of introducing fluid to treat into a chamber of a dryer;

a step of drying the fluid in the chamber by putting at a temperature comprised between 30° C. and 90° C. and at a pressure comprised between 10 mbars and 900 mbars, the drying step comprising a sub-step of evaporating at least some of the fluid, producing at least water vapor, and a sub-step of increasing salt concentration of the fluid contained in the chamber, the drying step comprising:

a first phase during which a weight of the chamber reduces and when the weight of the chamber reaches a lower threshold or a rate of variation of the weight of the chamber is less than a first predefined value, the drying step comprises a step of complementary filling of the chamber until the weight of the chamber reaches an upper threshold; and a second phase during which the weight of the chamber decreases and when the rate of variation of the weight is less than a second predefined value; and a step of extracting a solid residue in powder form.

2. The process according to claim 1, comprising a step of checking a weight of the chamber, and when the weight reaches the lower threshold or when the rate of variation of the weight of the chamber is less than the first predefined value, the process comprises a step of opening a filling valve and the step of complementary filling is implemented, and when the weight of the chamber reaches an upper threshold, the process comprises a step of closing the filling valve.

3. The process according to claim 1, wherein the drying step is configured to produce the solid residue with a moisture content comprised between 0.5% and 5%, by weight.

4. The process according to claim 1, wherein the drying step is configured to produce the solid residue in powder form of particle size comprised between 100 μm and 1000 μm on average.

5. The process according to claim 1, comprising a step of condensing vapor coming from the dryer, producing a condensate.

6. The process according to claim 5, comprising a step of introducing the condensate into a tank of rinsing water.

7. An installation configured to implement a process according to claim 1, the installation comprising a control system and at least one dryer, wherein the at least one dryer comprises at least one chamber and at least one inlet for fluid to dry, an outlet for discharging solid residue, a vapor outlet, a load cell system configured for weighing the chamber, and at least one filling valve, the at least one filling valve being configured to be open when a weight of the chamber reaches a lower threshold or when a rate of variation of the weight of the chamber is less than a first predefined value, and to be closed when the weight of the chamber reaches an upper threshold, and wherein the control system is configured to control an opening or a closing of the at least one filling valve according to the weight of the chamber measured by the load cell system.

8. The installation according to claim 7, wherein the dryer comprises a mixer configured to turn in the chamber at a speed comprised between 1 rpm and 100 rpm.

9. The installation according to claim 7, wherein the dryer chamber comprises a lump-breaker configured to limit a formation of lumps in the fluid treated in the chamber, the lump-breaker being configured to turn up to a speed of 1500 rpm.

10. The installation according to claim 7, wherein the chamber comprises a wall formed by a double jacket, and in that the double jacket is configured to cause a heat-conveying fluid to circulate therein.

11. The installation according to claim 10, wherein the heat-conveying fluid is configured to maintain a temperature between 30° C. and 90° C. in the chamber where the fluid is treated.

12. The installation according to claim 7, further comprising a vacuum module configured to produce a pressure in the chamber of the dryer comprised between 10 mbars and 900 mbars.

13. The installation according to claim 7, further comprising a condenser, connected to the vapor outlet of the dryer, the condenser being configured to condense the vapors coming from the dryer by the vapor outlet and produce a condensate, and wherein the installation comprises a condensate supply pipe configured to extract the condensate from the condenser and introduce the condensate back into a tank.

* * * * *